United States Patent [19]

Piotroski

[11] Patent Number: 4,527,790
[45] Date of Patent: Jul. 9, 1985

[54] APPARATUS AND METHOD FOR SEPARATING MULTIPLE WEBS OF DOCUMENTS HAVING THE CAPABILITY FOR ORDERLY SHUT-DOWN AND RE-START OF OPERATION

[75] Inventor: Peter N. Piotroski, Trumbull, Conn.

[73] Assignee: Pitney Bowes Inc., Stamford, Conn.

[21] Appl. No.: 665,686

[22] Filed: Oct. 29, 1984

[51] Int. Cl.³ .................................... B65H 41/00
[52] U.S. Cl. ......................... 270/58; 270/52.5; 364/146; 364/471; 364/478; 400/583.3; 53/500; 53/540; 340/712
[58] Field of Search .................. 270/52, 52.5, 53, 54, 270/58; 364/471, 478, 479, 146–147, 136; 400/583.2, 583.3; 360/53, 153; 53/493, 495, 499–500, 540; 340/712

[56] References Cited

U.S. PATENT DOCUMENTS

| | | | |
|---|---|---|---|
| 3,260,517 | 7/1966 | Sather | 270/58 |
| 3,652,078 | 3/1972 | Sather et al. | 270/58 |
| 3,804,005 | 4/1974 | Burger et al. | 270/58 |
| 4,146,216 | 3/1979 | Brown | 270/58 |
| 4,194,685 | 3/1980 | Hill et al. | 270/58 |
| 4,211,483 | 7/1980 | Hannigan | 270/58 |
| 4,332,464 | 6/1982 | Bartulis et al. | 340/712 |
| 4,358,016 | 11/1982 | Richardson et al. | 364/478 |
| 4,384,196 | 5/1983 | McCumber et al. | 270/58 |
| 4,395,255 | 7/1983 | Branecky et al. | 493/439 |
| 4,479,197 | 10/1984 | Haag et al. | 340/712 |
| 4,497,040 | 1/1985 | Gomes et al. | 364/900 |

Primary Examiner—E. H. Eickholt
Attorney, Agent, or Firm—William D. Soltow, Jr.; David E. Pitchenik; Robert H. Whisker

[57] ABSTRACT

A document inserter system having an improved control system is disclosed. The system includes a sheet inserter system and one or more web modules for, receiving a web of forms, scanning the forms for information, storing and retransmitting the information, separating the web into discrete forms and feeding the forms for further processing. The information includes control information scanned from a control document for controlling formation of a batch of forms associated with that control document. The control system includes a supervisory control processor which receives the control information and controls the sheet inserter system and the web modules in accordance therewith. The system also includes web control processor systems for direct control of each web module, which web control processor systems are responsive to the supervisory control processor. The system is controlled in accordance with a prespecified configuration which defines the document type for each web module. An operator input is provided whereby an operator may specify a configuration for a mailing. In one embodiment the configuration is specified by interactive selection from a menu displayed by the supervisory control processor. A system and method for orderly shut-down and restart of the inserter system are also disclosed.

6 Claims, 10 Drawing Figures

APPARATUS AND METHOD FOR SEPARATING MULTIPLE WEBS OF DOCUMENTS HAVING THE CAPABILITY FOR ORDERLY SHUT-DOWN AND RE-START OF OPERATION

RELATED APPLICATIONS

The present application is one of the following four applications; each having common inventorship, filing date, and assignee; and all relating to inserter systems:

| Attorney's Docket No. | Title |
|---|---|
| S.N. 665816 | APPARATUS FOR SEPARATING MULTIPLE WEBS OF DOCUMENTS INTO DISCRETE DOCUMENTS AND FORMING THE DISCRETE DOCUMENTS INTO PREDETERMINED BATCHES |
| S.N. 665687 | INSERTER SYSTEM FOR FORMING PREDETERMINED BATCHES OF DOCUMENTS AND INSERTING THE BATCHES INTO ENVELOPES |
| S.N. 665686 | APPARATUS AND METHOD FOR SEPARATING MULTIPLE WEBS OF DOCUMENTS HAVING THE CAPABILITY FOR ORDERLY SHUT-DOWN AND RE-START OF OPERATION |
| S.N. 665685 | INTERACTIVE SYSTEM FOR DEFINING INITIAL CONFIGURATIONS FOR AN INSERTER SYSTEM |

BACKGROUND OF THE INVENTION

This invention relates to inserter systems which assemble batches of documents, which may be sheets and/or forms, for insertion into envelopes. More particularly it relates to control systems for such inserter systems. (By sheets herein is meant single sheet documents and by forms herein is meant documents which comprise a web and which are separated from such web by such inserter systems).

Such systems are known in the art and are generally used by organizations which make large mailings where the contents of each item mailed may vary. Such systems typically comprise: feeder modules for insertion of sheets into a batch, either multiply or singly; web modules for separating webs into discrete forms and inserting the discrete forms into the batch; envelope modules for inserting the batches into envelopes; a transport system for conveying sheets and forms through the various modules to form proper batches; inserter modules for inserting the batches into envelopes, which are preferably preaddressed; optionally, meter modules for metering the envelopes with appropriate postage; and a control system to synchronize the operation of the inserter system to assure that the batches are properly assembled, inserted into envelopes, and, possibly, metered.

Information for control of such known inserters system is read from a control document, which is preferably a form, by a scanner associated with the feeder module or web module which feeds that document. Preferably that module is the most upstream module along the transport system. The scanner reads information from the control document which typically includes information such as information defining the number of documents to be inserted at each module, information providing an I.D. code for comparison with I.D. codes on inserted documents to assure that documents are properly matched, and, possibly, information for other purposes such as selection of postage This control information is then transmitted to the control system which controls the operation of the inserter system accordingly to assure the proper assembly and processing of each batch as defined by a control document.

As noted above control documents are preferably forms since compilation of the control information for each batch is most readily done through data processing with output through a line printer onto a web of computer printout forms. Accordingly, inserter systems generally comprise an upstream web module, or modules, which feed accumulations of forms (i.e., a control form and optionally, one or more succeeding non-control forms from the web) into a sheet inserter system; including feeder modules, inserter modules and, possibly, postage meter modules, where appropriate sheets would be inserted to complete the batch, the batch inserted into an envelope, and, possibly, postage indicia imprinted. Such sheet inserter systems are known and typical examples are described in U.S. Pat. No. 3,606,728; issued: Sept. 21, 1971; to: Sather et al; assigned to Bell and Howell Co.; and U.S. Pat. No. 3,935,429; issued: Jan. 27, 1976; to: Braneky et al; assigned to: Pitney Bowes Inc.

Web modules comprise a forms feeder which feeds a web of forms into a burster-folder, where the web is separated into discrete forms, which may be folded to fit into an envelope, if necessary, and a scanner which reads information from the web before bursting. To prevent accidental premature bursting a slack loop of web is maintained between the forms feeder and the burster-folder.

Typically, before the web is fed into the burster-folder the forms feeder removes the sprocket strips, which are used to drive the web, from the web. Accordingly, in systems where control information is printed on the sprocket strips (in order not to print extraneous information on the form to be mailed) the scanner must be positioned to scan the web before the sprocket strips are removed.

Web modules may also include an accumulator which accumulates a number of succeeding non-control forms with a control form and then feeds the accumulation into a batch.

The mechanical construction and operation of web modules is well understood by those skilled in the art as is, as mentioned above, the control, construction and operation of conventional sheet inserter systems. U.S. Pat. No. 4,395,255; issued: July 26, 1983; to: Braneky et al; assigned to: Pitney Bowes Inc. teach typical web handling equipment. Further discussion of sheet inserter systems and the mechanical aspects of web modules used in embodiments of the subject invention is not believed necessary for an understanding of the subject invention as described below and will not be discussed further herein.

Such systems have in the past proved satisfactory for the automatic assembly of large mailings of varying items. They have, however, suffered from the disadvantage of an inflexible control structure, typically implemented with discrete hardwired logic, which was substantially limited in selection of configurations. (By configuration herein is meant parameters defining various aspects of a mailing which might include aspects such as form length, positioning of control information on the control document, the meaning of particular codes used to express the control information, the identity of the module which feeds the control document, and/or the number of forms needed in the slack loop.) Further, to the extent configurations could be changed such changes were complexed operations typically requiring the operator to make adjustments at various modules.

Another problem was found in previously known inserter systems of the type wherein control information was printed on the sprocket strips. When an operator would halt the system in the middle of a mailing the system would complete operations on an item in process before halting. But frequently control forms with the sprocket strips, and the control information printed thereon, removed would be halted in the web loop. Thus, restarting the system to process these stripped control documents was a complex and difficult process.

OBJECT OF THE INVENTION

It is an object of the subject invention to provide a system for the orderly shut down and restart of a multi-web inserter system of the type wherein control information is imprinted on the sprocket strips of control forms included in a first web, and the control information is scanned and the sprocket strips removed from the web prior to separation of the web into discrete forms.

BRIEF SUMMARY OF THE INVENTION

The above object is achieved and the disadvantages of the prior art are overcome by means of a system comprising a first web module for receiving the first web, scanning the sprocket strips of the first web for control information, removing the sprocket strips, storing and retransmitting the control information, separating the web into discrete forms, forming accumulations of the discrete forms, and feeding said accumulations for further processing by the system. The system further includes a second web module for receiving a second web, separating the second web into second discrete forms, forming second accumulations of the second discrete forms, and feeding the second accumulations synchronously with the first accumulations for further processing by the system. The system is controlled by a supervisory control system which includes a non-volatile memory, which supervisory control system receives the retransmitted control information and controls the operation of the system. The supervisory control system is further responsive to a shut-down signal to complete operations in accordance with control information from control forms which have been separated from the first web, receive from the first web module the control information associated with unseparated control forms from which the sprocket strips have been removed, store this information in the non-volatile memory, and halt operation of the system. The supervisory control system is further responsive to a restart signal to read the stored information from the non-volatile memory and restart operations in accordance with the stored information to complete processing of the control documents from which the control information has been removed.

Accordingly, the subject invention achieves the above object and overcomes the disadvantages of the prior art. However, other objects and advantages of the subject invention will be readily apparent to those skilled in the art from the detailed description of preferred embodiments set forth below and from consideration of the attached drawings.

DETAILED DESCRIPTION OF PREFERRED EMBODIMENTS OF THE INVENTION

Figure 1:
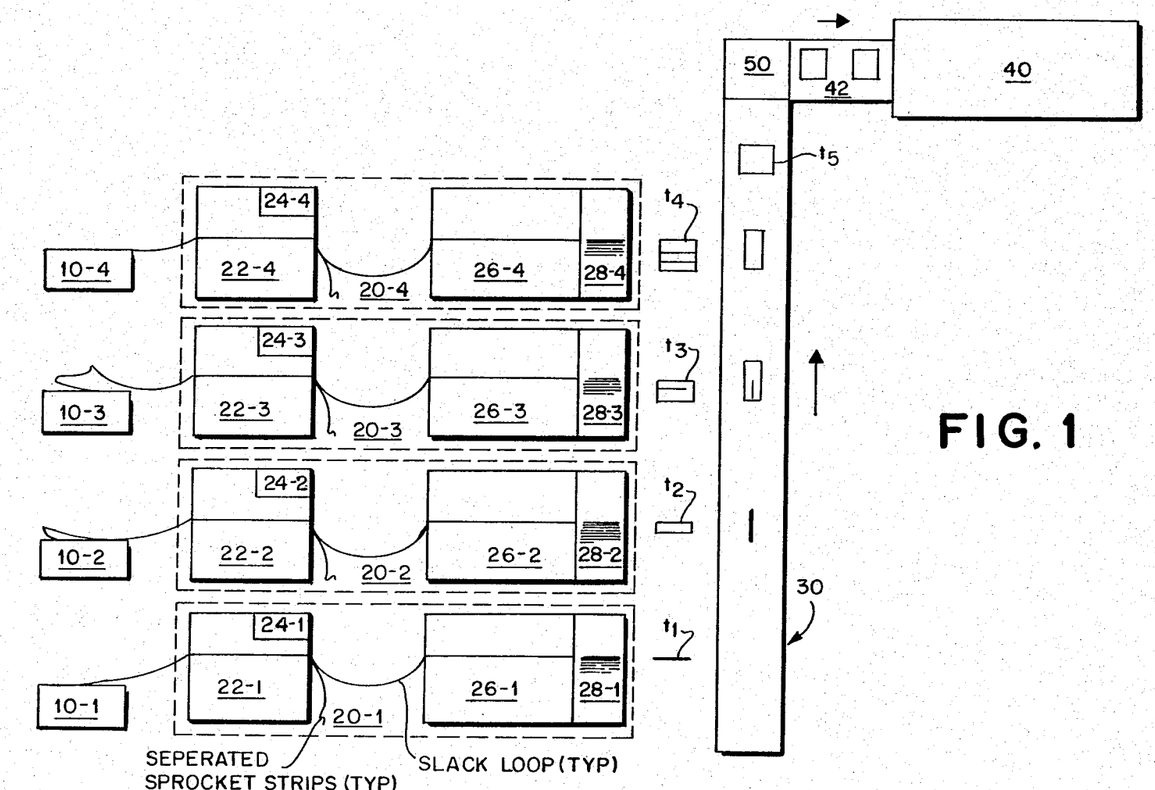
FIG. 1 shows a schematic representation of an inserter system including a multi-web inserter system and a sheet inserter system.

FIG. 1 shows a schematic representation of an inserter system in accordance with the subject invention. The system of FIG. 1 includes 4 web modules 20-1 through 20-4 which feed webs of computer print-out forms 10-1 through 10-4 into the system. Each web module 20 feeds a web 10, scans it for information, separates webs 10 into discrete forms and forms accumulations of discrete forms in accordance with the information scanned from a control form included in the most upstream web 10-1. These accumulations are then fed synchronously to transport unit 30. Selected accumulations from one or more of web modules 20 are gathered with the control document on transport unit 30 to form batches of forms for further processing. In FIG. 1, an example of this grouping of accumulations of forms into batches is shown at times $t_1$ through $t_5$. At $t_1$ the control form, possibly with an accumulation of non-control forms from web 10-1, is fed to transport unit 30 to begin grouping appropriate forms into a batch. At $t_2$ transport unit 30 moves the batch to web module 20-2 where, in accordance with information scanned from the control document an accumulation of forms from web module 20-2 is grouped with the batch. At $t_3$, the batch is moved to web module 20-3, where in accordance with the information scanned from the control document no accumulation of forms is added. Similarly, at $t_4$ an accumulation from web module 20-4 is added to the batch.

At $t_5$ the batch is fed to transfer unit 50 which transfers the batch to the transport unit 42 of sheet inserter module 40 where additional sheets may be added to the batch, the batch inserted in an envelope and appropriate postage imprinted on the envelope in accordance with the information scanned from the control document Sheet inserter system 40 and transfer unit 50 may be conventional units known and well understood by those skilled in the art, such as the INSERTAMAX II or INSERTAMAX III systems, available from the Pitney Bowes Corporation of Stamford, Conn. Alternatively, sheet inserter system 40 may be a more sophisticated system such as that described in the commonly assigned copending application entitled Universal Multi-Station Document Inserter, Ser. No.: 394,388, Filed: July 1, 1982, To: Peter N Piotroski and John M. Gomes. The operation of such INSERTAMAX type transfer units and sheet inserter systems would be well understood by those skilled in the art and need not be described further here for an understanding of the subject invention.

(Those skilled in the art will also recognize that the description of the subject invention has so far focused on a single batch as it moved through the system. However, they will also readily recognize that, given the high speed of electronic control systems in comparison to the mechanical operations of the inserter system, it would be a straight forward matter to concurrently control a number of batches moving sequentially through the system. However, though such concurrent control is in fact preferable, for the purpose of clarity the description of the subject invention herein will continue to focus on the sequence of operations on a single batch with the implicit understanding that other batches at other states of processing may proceed and follow that batch through the system.)

Returning to FIG. 1, web module 20-1 is typical of web modules used in embodiments of the subject invention. It comprises a forms feeder 22-1 which draws in web 10-1 by means of sprocket wheels engaged with sprocket strips fixed to the edges of web 10-1. Forms feeder 22-1 draws web 10-1 past scanner 24-1 and separates the sprocket strips from web 10-1 before feeding it to burster-folder 26-1. Forms feeder 22-1 is controlled to maintain a slack loop of web between itself and burster-feeder 26-1 and to feed web 10-1 on a demand basis.

Scanner 24-1 scans the forms in the web for machine readable information imprinted on the forms in the web. In module 20-1 this would include control information printed on control documents and, possibly, I.D. information printed on other, non-control, documents in web 10-1. In downstream modules 20-2 through 20-4 scanners 24-2 through 24-4 would scan for I.D. information. (Though those skilled in the art will recognize that inclusion of all control information on a single control document is preferable in terms of simplicity of operation, they will also recognize that additional control information may be included on documents fed by other modules and the response of the system modified in accordance with such additional control information.) Scanner 24-1 is positioned to scan web 10-1 prior to the point where the sprocket strips are removed since in many embodiments of the subject invention information is printed on the sprocket strips rather than on the face of the forms themselves.

Burster-folder 26-1 separates web 10-1 into discrete forms and accumulates these forms in accumulator 28-1. In web module 20-1, the control form, and possibly a number of succeeding non-control forms from web 10-1, are accumulated in accumulator 28-1 in accordance with control information on the control document. In downstream web modules 20-2 through 20-4, other accumulations of discrete forms which are to be added to the batch defined by the control document may be accumulated. These accumulations are fed to transport unit 30 in synchronism so as to properly form the batch defined by the control document. As described above, this batch is then fed to transfer unit 50 and sheet inserter system 40 for further processing in a conventional manner.

The mechanical aspects of handling webs such as 10-1 separating them into discrete forms, accumulating the forms, transferring the accumulations to a transport unit such as unit 30 and transporting the batches on transport unit 30 to a sheet inserter system such as 40 are known and well understood by those skilled in the art. Accordingly, a further description of the mechanical aspects of the inserter system of the subject invention is not believed necessary to an understanding of the subject invention and will not be provided herein; except to note that it is believed preferable to operate transport unit 30 asynchronously with transport unit 42 and to feed batches to transfer unit 50 and sheet inserter system 40 on a demand basis.

Figure 2:
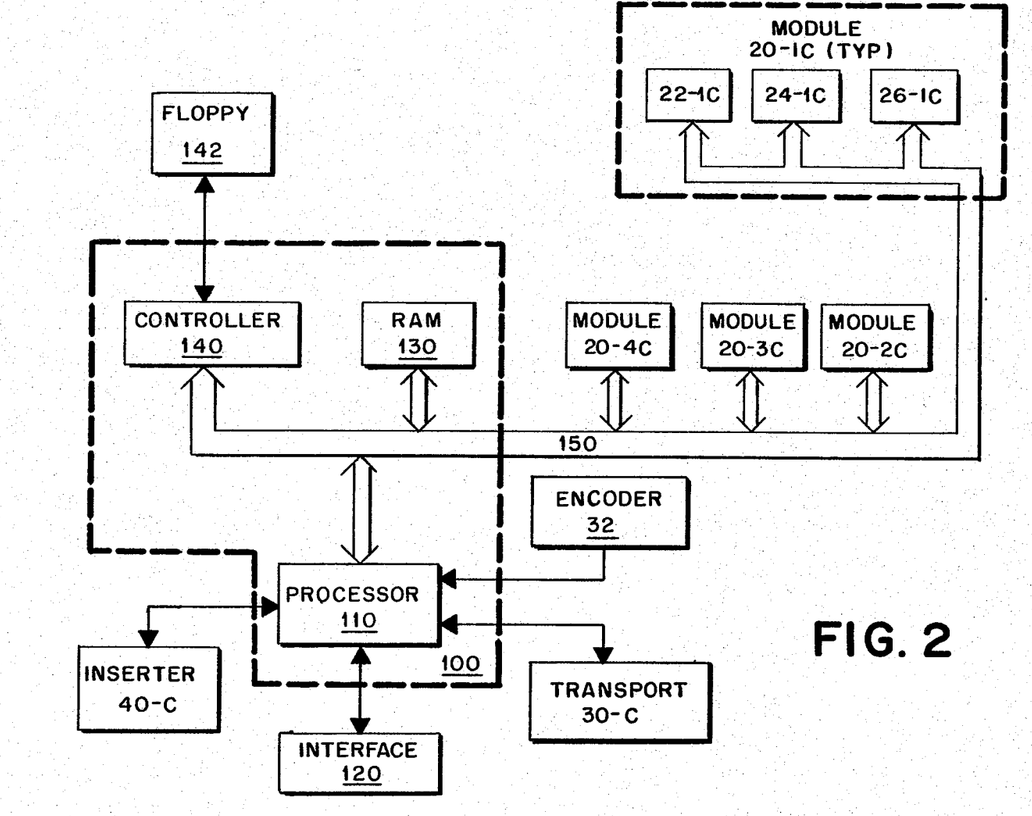
FIG. 2 shows a block diagram of the control system for the inserter system of FIG. 1.

FIG. 2 shows a block diagram of the control system for the inserter of FIG. 1. The control system includes module control systems 20-1c through 20-4c, which control web modules 20-1 through 20-4 respectively and supervisory control system 100. Module control systems 20-1c through 20-4c are substantially identical and module 20-1c is shown in FIG. 1 as typical. Module control means 20-1c in turn comprises 3 microprocessors 22-1c, 24-1c and 26-1c, which may be Intel Model 8741 Microprocessors available from the Intel Corp. Santa Clara, Calif., and which control form feeder 22-1, scanner 24-1 and burster-folder 26-1, respectively.

Supervisory control system 100 comprises a single board computer, including processor 110, and which may be a Model SPC 20/4, also available from the above Intel Corp. Supervisory control system 100 also includes random access memory (RAM) 130, which serves as the program memory for supervisory control system 100, and a non-volatile memory, which in the embodiment of FIG. 2 comprises a floppy disk drive 142 and floppy disk controller 140, which is used to initially load the operating program during start-up, as well as other information as will be described further below. Supervisory control system 100 also includes an operator interface 120 which is used by an operator to input the configuration for a mailing. Preferably, interface 120 comprises a touch screen, such as an INFOTOUCH model touch screen sold by Fluke Manufacturing Co., Seattle, Wash., but may also be any of a number of other well known conventional operator interfaces.

In the embodiment shown, transport unit 30 operates under the direct control of supervisory control system 100 through a conventional interface/controller 30-c which is connected to an I/O channel of processor 110. Encoder 32 provides position information to processor 110 for control of transport unit 30.

Supervisory control system 100 also communicates with sheet inserter system 40 through inserter interface 40-c, which is also directly connected to an I/O channel of processor 110. As noted above, sheet inserter system 40 operates, in the embodiment illustrated, under its own control system. Accordingly, supervisory control system 100 communicates to inserter 40 parameters which define the operations to be carried out on a batch by sheet inserter system 40 in accordance with information scanned from the control document.

Figure 3:
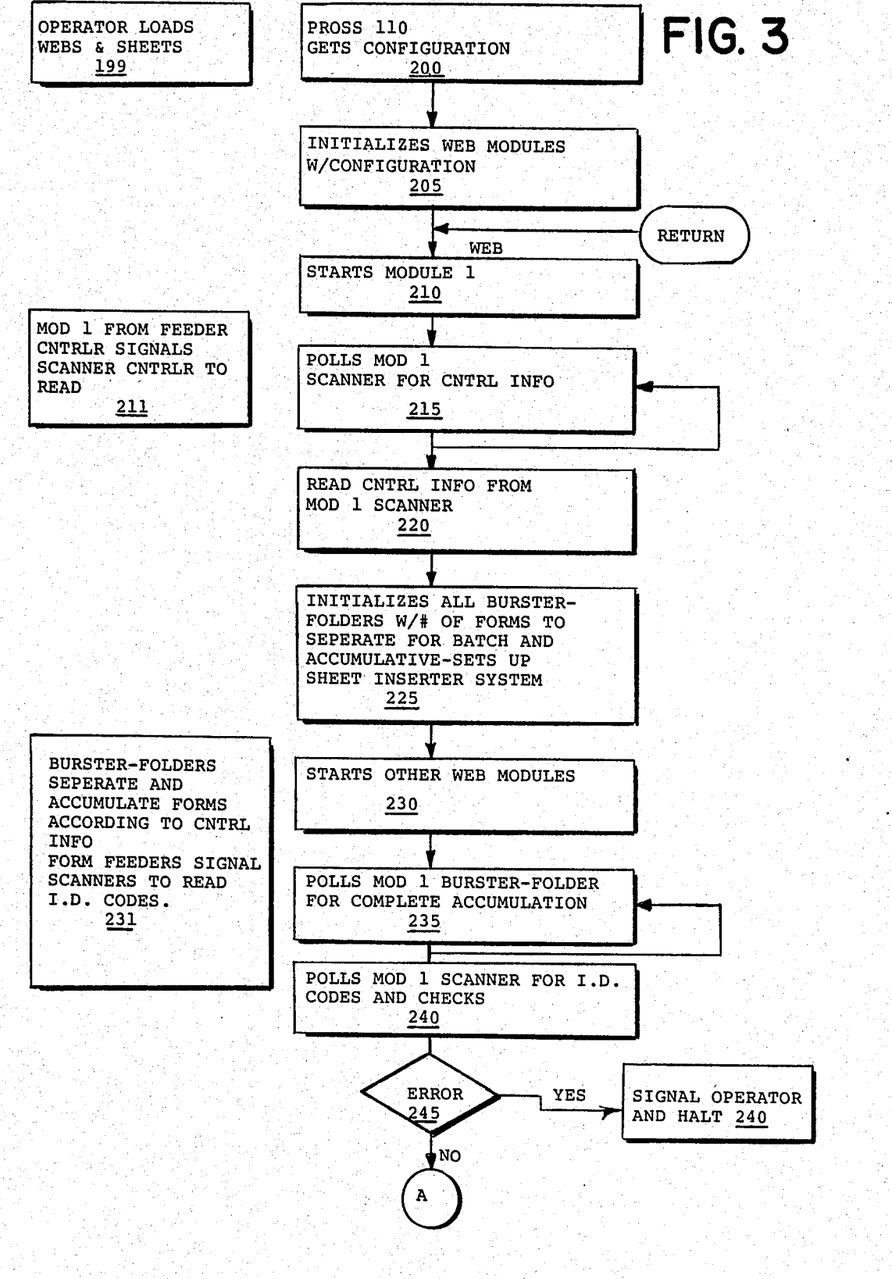
FIGS. 3 and 3a show a simplified flow chart for the operation of the inserter system of FIG. 1.
Figure 3A:
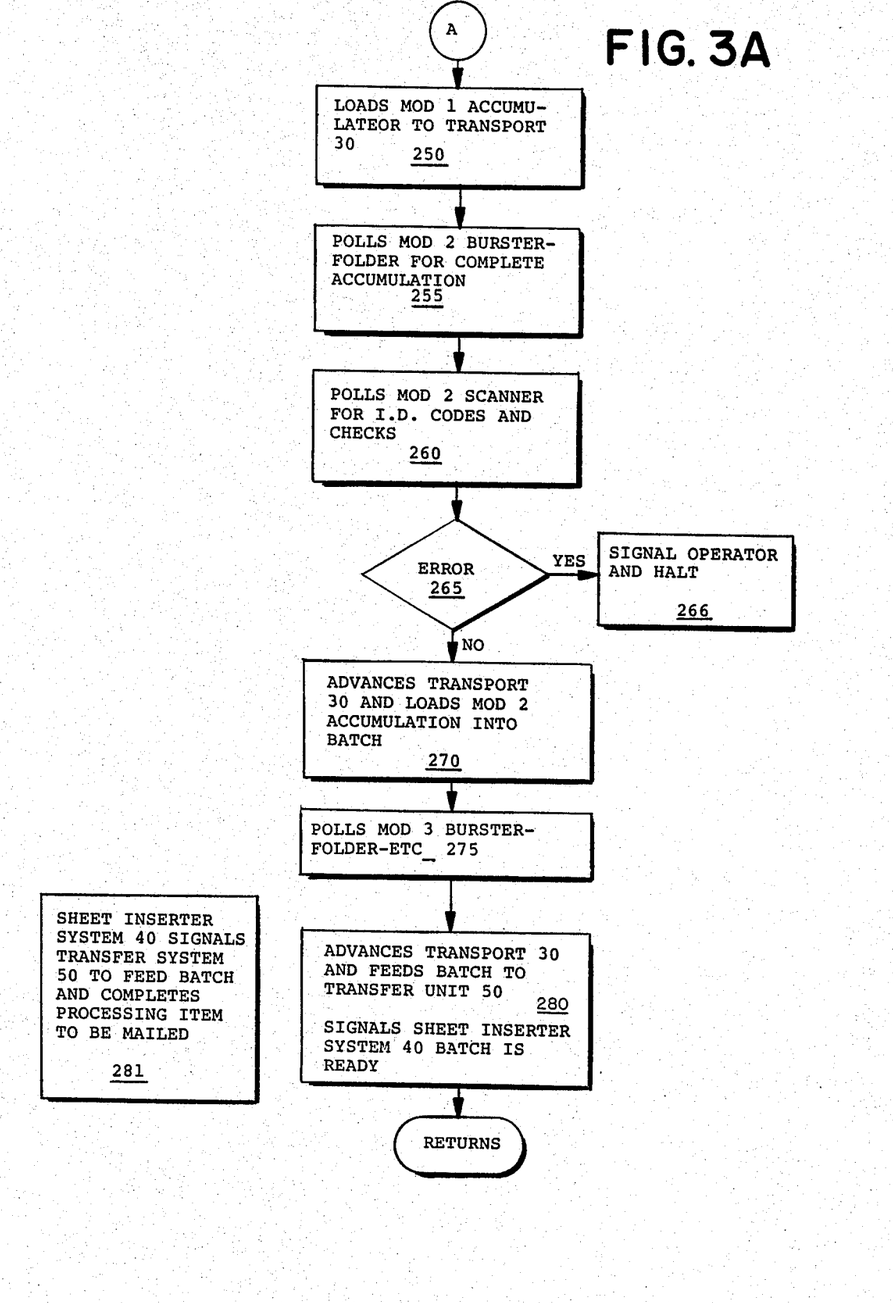

FIG. 3 shows a simplified flow chart of the operation of the inserter system of the subject invention. At 199, the operator loads webs 10-1 through 10-4 into web modules 20-1 through 20-4, initially aligning each web so that its start position is known. The operator also loads appropriate sheets into the feeder stations of sheet inserter system 40 in accordance with the instructions for a particular mailing. At 200, the operator inputs information defining the configuration for that mailing through operator interface 120 in a manner which will be described more fully below. This configuration information defines various parameters for the forms of webs 10-1 through 10-4 to be used with a particular mailing. Typically, such information would include form length, position of control and I.D. information on the form (in the embodiments illustrated the horizontal position(s) of the information is fixed by a factory adjustment of the system and only the vertical position(s) need be defined) and information defining the particular codes used to print the information on the forms. (Typically "dash code" where the information is encoded by the presence or absence of lines of dashes). The configuration may also include information such as which web module will feed the web containing the control forms, and the number of documents to be maintained in the loop between the forms feeder and the burster-folder. After receiving the configuration definition supervisory control system 100 initializes module control systems 20-1c through 20-4c in accordance with that configuration. Assuming that web module 20-1 will feed the control forms, forms feeder control 22-1c is initialized with information defining the length of forms and the position of information on the forms, while scanner control system 24-1c is initialized with information for interpreting the codes on the forms of web 10-1. Other module control systems 20-2c through 20-4c will be initialized in a similar manner except that scanner 24-1 will scan for both control information and I.D. codes while the other scanners will scan only for I.D. codes. At 210 supervisory control system 100 starts web module 1. Forms feeder control 22-1c controls forms feeder 22-1 to advance web 10-1 to establish a loop and feed into burster-folder 26-1. As web 10-1 advances forms feeder controller 22-1c monitors the positions of the forms and as information passes scanner 24-1 forms feeder control 22-1c signals scanner control 24-1c to start scanning, as shown at 211. At 215, supervisory control system 100 polls scanner controller 24-1c for control information. Scanner controller 24-1c interprets the information read from the forms in accordance with the information provided defining the configuration and responds to supervisory control system 100 when it has read control information from a control form. At 220, supervisory control system 100 responds to a signal from scanner controller 24-1c to exit its polling loop and read the control information from scanner controller 24-1c. This control information defines the particular batch associated with that particular control form. In response to this control information supervisory controller 100 controls burster-folder controller 26-1c to separate and accumulate in accumulator 28-1 a particular number of forms as defined by the control information for the batch associated with the particular control form. It also transmits to sheet inserter system 40 the information defining the number of sheets to be inserted at each feeder station of sheet inserter system 40, and, possibly, information defining the postage to be applied to that particular batch. At 230, supervisory control system 100 starts web modules 20-2 through 20-4. At 231, burster-folders separate and accumulate forms according to the control information into accumulators 28-2 through 28-4. Form feeder controllers 22-2c through 22-4c signal scanner controllers 24-2c through 24-4c to scan forms for I.D. codes. At 235 supervisory controller system 100 loops to poll burster-folder controller 26-1c to determine when the accumulation is complete. When burster-folder controller 26-1c signals supervisory controller system 100 that the accumulation is complete system 100 exits the polling loop and polls scanner controller 24-1c for I.D. codes and checks the I.D. codes to assure that the accumulation has been formed properly. (Preferably, I.D. codes will consist of random 3 or 4 bit binary numbers imprinted on each document associated with a particular batch.)

If an error is found at 245, the inserter system of the subject invention signals the operator and halts (or takes other appropriate action in response to the error).

If no error is found, at 250 supervisory control system 100 loads the accumulation of discrete forms in accumulator 28-1 onto transport unit 30. At 255 supervisory control system 100 polls burster-folder controller 26-2c for a complete accumulation. When burster-folder controller signals that the accumulation is complete in accumulator 28-2 supervisory controller system 100 exits the polling loop and poles scanner controller 24-2c for I.D. codes at 260 and checks, after receiving the codes, to assure that the appropriate forms have been added to the batch. At 265, if an error is detected, the system again signals the operator and halts at 266. If no error is detected, supervisory control system 100 advances transport unit 30 and loads the contents of accumulator 28-2 onto transport unit 30 adding them to the batch.

At 275, these operations are repeated for web modules 20-3 and 20-4.

When all forms have been added to the batch, supervisory control system 100 advances transport unit 30 and feeds the batch to transfer unit 50, at 280 supervisory control system 100 also signals sheet inserter system 40 that a batch is read and returns to begin processing another batch. At 281, sheet inserter system 40 signals transfer unit 50 to feed the batch and completes processing.

Those skilled in the art will again note that the processing the batch has been described in a sequential manner for the purpose of clarity of explanation. It will be apparent to them however, that it is both preferable and well within their ordinary skill to rearrange and interleave the operations of the inserter system of the subject invention in a "pipeline" fashion so that more than one batch may be in process at the same time.

FIGS. 4 through 9 show the displays on the touch screen of operator interface 120 used to establish configurations for a particular mailing.

Figure 4:
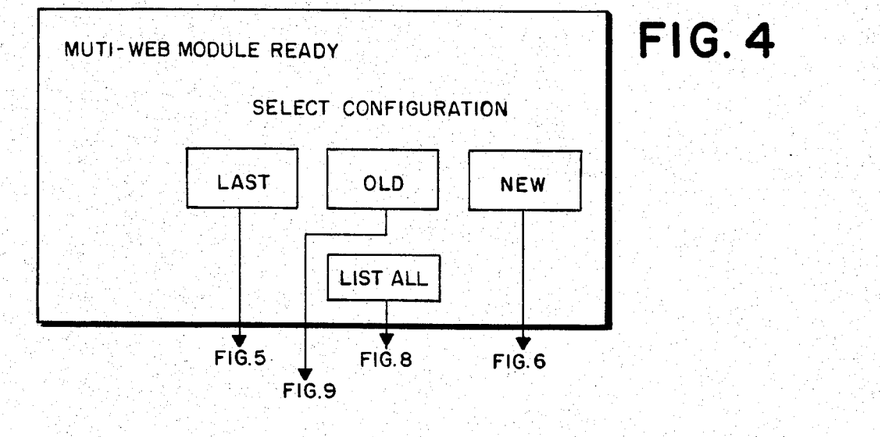
FIGS. 4–9 show various menus displayed for selection of the initial configuration for a mailing.

When the inserter system of the subject invention is initially energized, supervisory control system 100 enters a conventional power-up routine and performs various checks to assure that the system is operational. If the system checks out properly, the image shown in FIG. 4 is displayed on the touch screen of interface 120. By selecting one of the labeled areas shown, the operator may select a configuration for a particular mailing.

Figure 5:
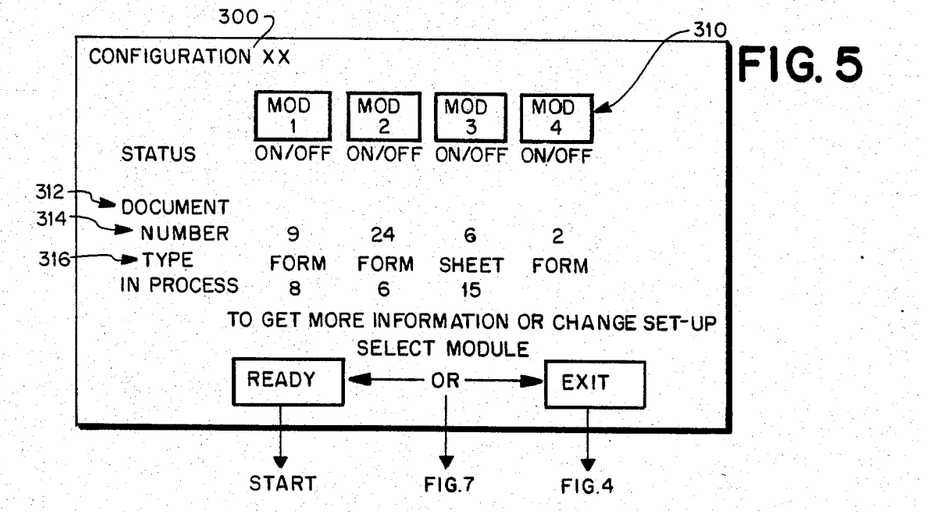
Figure 6:
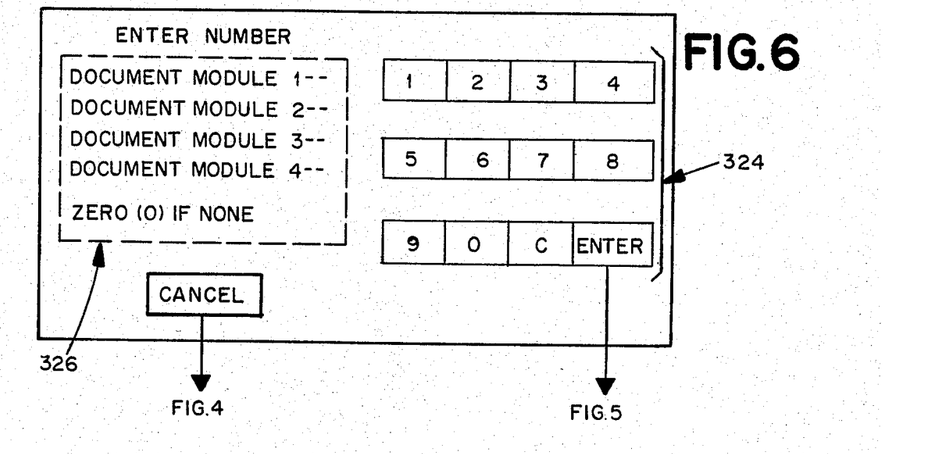

By touching the area labeled "LAST" the operator will select the last used configuration and the image shown in FIG. 5 will be displayed on the touch screen. This image provides information defining the configuration which will run if the operator signals acceptance by touching the area marked "READY". The configuration number is displayed at 300 and the on/off status of each web module is displayed at 310. At 312, the document number defining the particular document type to be run in each module is displayed. At 314 the kind of document, whether a form or sheet, is displayed. At 316, the number of documents currently in process in the web module is displayed.

The document numbers displayed at 312 define document types in terms of predefined information stored on floppy disk 142. This information defines particular types of documents, identified by particular document numbers, in terms of document kind, length, position of machine readable information, whether or not the document may be a control document, and information needed to interpret machine readable information on the document. Thus, the specification of document numbers for each web module specifies a configuration in terms of the stored, predetermined information.

If the operator does not choose to run the configuration displayed, he may return to the screen of FIG. 4 by touching the area marked "EXIT".

(Note from FIG. 5 that web modules 20-1 through 20-4 may optionally be equipped with a sheet feeder option to allow them to handle both sheets and webs of forms.)

Figure 7:
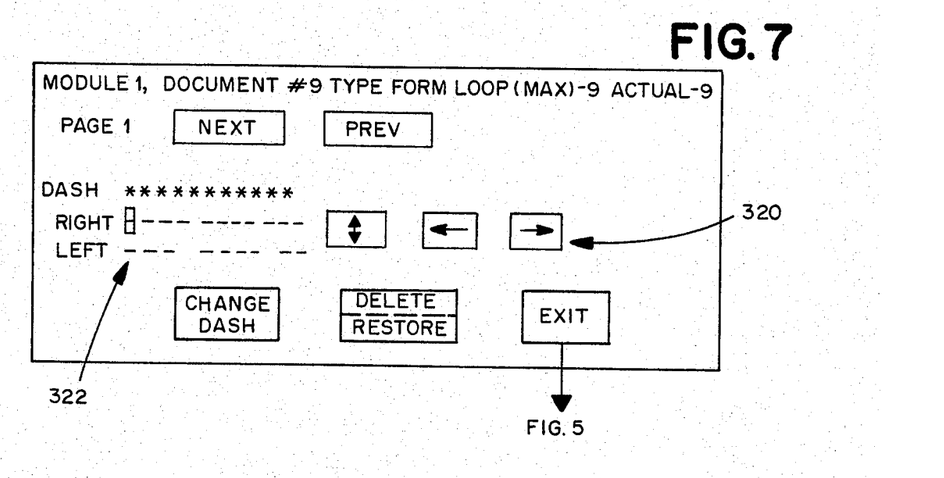

Alternatively, the operator may touch the area marked "OR" to display the image shown in FIG. 7. This image provides more detailed information on each actual document in web modules 20-1 through 20-4; particularly at 322 the actual dash code on each document is shown. By using the left, right, up/down, change, and delete/restore areas, the operator may move among the various dashes of the dash codes displayed and selectively change them to change the effective dash code on a document. This would, for example, allow correction of an erroneously read dash code. By using the areas marked "NEXT" and "PREV", the operator may then move from document to document. When satisfied the operator may return to the image of FIG. 5 by touching the area marked "EXIT". If the operator now touches the area marked "READY", the configuration displayed will be run, including any corrections entered through FIG. 7.

Figure 9:
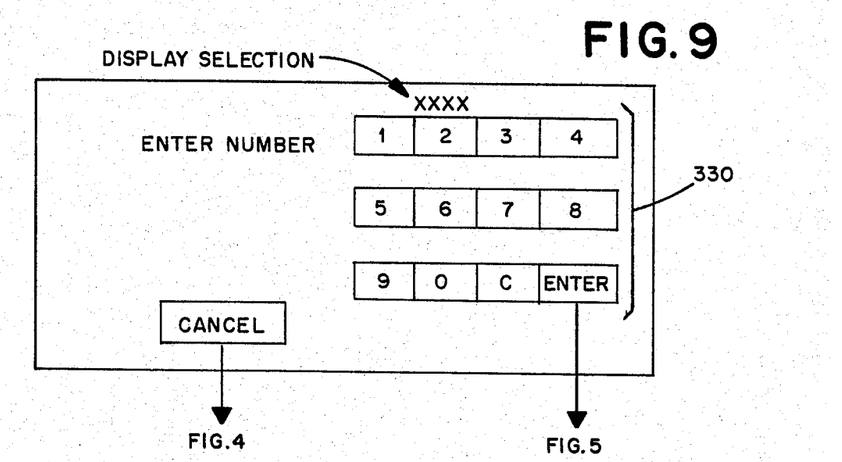

Touching the area marked "OLD" on the touch screen causes the image shown in FIG. 9 to be displayed. Entering the number of a previously established configuration through the numeric pad area 330 shown on the touch screen then touching the area marked "ENTER" returns the system to the image of FIG. 5 which then displays the status of the entered old configuration. The operator may then proceed to start the system, change the set up, or exit, as described above.

The operator may create new configurations by touching the area marked "NEW" on the touch screen of FIG. 4. The system will then display the image shown in FIG. 6. The operator may then enter a document number for each web module 20-1 through 20-4 of the above-described embodiment of the subject invention, entering zero for non-selected modules. After the document number for the last web module is entered, the system displays the image of FIG. 5 and operations proceed as described above.

Figure 8:
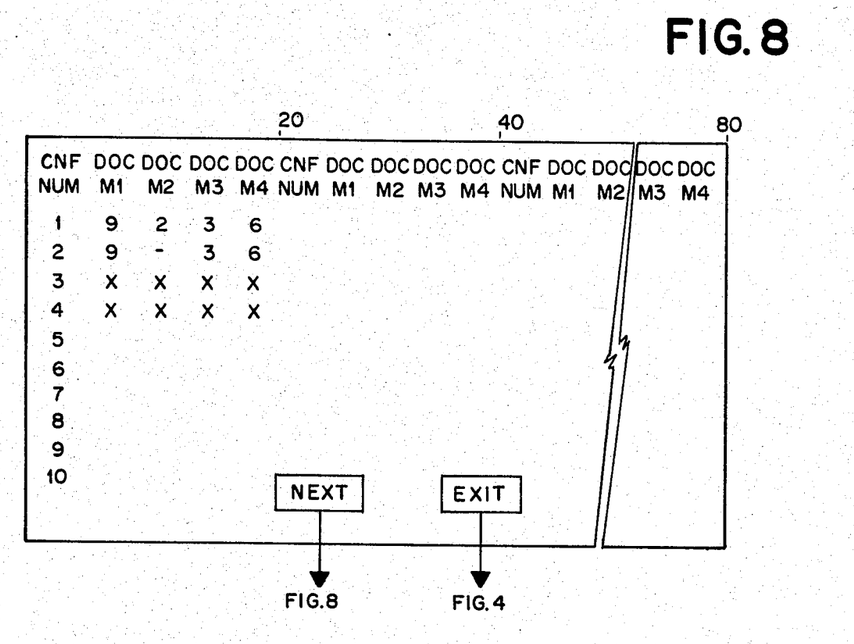

By touching the area marked "LIST ALL" in the image of FIG. 4, the operator may cause the system to display the image of FIG. 8 on the touch screen. This image shows a listing of all established configurations for the system. By touching the area marked "NEXT", the operator may call up more configurations if the number of defined configurations exceeds the available space for display. By touching the area marked "EXIT", the operator may return to the image of FIG. 4.

As noted above, touch screens are well known commercially available devices and programming of supervisory control system 100 to control the touch of interface 120 in the above-described manner, is also a well known conventional technique well within the skill of those skilled in the art.

As noted above, in embodiments of the subject invention where information is printed on the sprocket strips of the control forms a problem arises when an operator halts the system in the middle of a mailing. Control forms in the loop between form feeder 22-1 and burster-folder 26-1 have had the control information removed with the sprocket strips. Accordingly, in the inserter system of the subject invention when supervisory control system 100 receives a shut-down signal it completes processing of control forms which have been separated from web 10-1 and their associated batches and polls scanner control 24-1c for the control information and I.D. numbers which have been read from the forms in the loops. Prior to shut-down then the information is stored on a disk in floppy disk drive 142. On start-up this information is recalled from the disk and the inserter system may be restarted in this configuration by selecting the "LAST" option from the touch screen in the manner described above.

The above described preferred embodiments have been given by way of illustration of the subject invention only, and many other embodiments will be readily apparent to those skilled in the art from consideration of the above description and the attached drawings. Particularly, it is within the contemplation of the subject invention that control of the various functions and operations described above may be allocated differently among various processors and/or that more powerful processors may be substituted for the plurality of processors used in the web module control systems. Accordingly, limitations on the scope of the subject invention are to found only in the claims set forth below.

I claim:

1. A system for orderly shut-down and restart of a multi-web inserter system of the type wherein control information is imprinted on the sprocket strips of control forms included in a first web, said control information is scanned and said sprocket strips removed from said web prior to separation of said web into discrete forms, comprising:

(a) first web module means for;

receiving said first web;

scanning said sprocket strips for said control information;

removing said sprocket strips;

storing and retransmitting said control information to supervisory control means for the control of said inserter means in accordance with said control information;

separating said web into said discrete forms;

forming accumulations of said forms;

feeding said accumulations for further operations by said system;

(b) a second web module means for receiving a second web;

separating said second web into second discrete forms;

forming second accumulations of said second discrete forms, feeding said second accumulations synchronously with said first accumulations for further operations by said system;

(c) supervisory control means, including non-volatile memory means, for receiving said retransmitted control information and generating signals for control of said inserter system in accordance therewith;

said supervisory control means being responsive to a shut-down signal to complete operations in accordance with said retransmitted control information associated with control forms which have been separated from said first web;

receive from said first web module means said control information associated with unseparated control forms from which said sprocket strips have been removed;

store said information associated with said unseparated control forms in said non-volatile memory;

halt operation of said system; and, said supervisory control means being further responsive to a restart signal to read said stored information from said non-volatile memory and restart operations in accordance with said stored information.

2. A system as described in claim 1 wherein said non-volatile memory comprises a disk.

3. A system as described in claim 1 wherein said supervisory control means is responsive to an input means for input by an operator of information defining a configuration to be used for a mailing, said input means including display means responsive to said supervisory control means for displaying menus, said operator defining said configuration by selecting among the choices on said menus, and wherein further said supervisory control means is responsive to a start-up signal to retrieve said stored information from said non-volatile memory and display a first menu including information defining the control information from any of said stripped control forms remaining in said multi-web inserter system and further displaying a choice of restarting the previous configuration in accordance with said displayed control information.

4. A system described in claim 2 wherein said supervisory control means is responsive to an input means for input by an operator of information defining a configuration to be used for a mailing, said input means including display means responsive to said supervisory control means for displaying menus, said operator defining said configuration by selecting among the choices on said menus, and wherein further said supervisory control means is responsive to a start-up signal to retrieve said stored information from said non-volatile memory and display a first menu including information defining the control information from any of said stripped control forms remaining in said multi-web inserter system and further displaying a choice of restarting the previous configuration in accordance with said displayed control information.

5. A method for controlling shut-down and restart of a multi-web inserter system comprising the steps of:
(a) scanning control information from the sprocket strips of control forms included in a web of forms;
(b) removing said sprocket strips from said control forms;
(c) separating said control forms from said web and forming batches of documents associated with said control forms, in accordance with said control information;
(d) in response to a shut-down signal completing operations for each of said separated control forms;
(e) storing control information from control forms from which said sprocket strips have been removed but which have not been separated from said web in non-volatile memory; and,
(f) in response to a restart signal retrieving said stored information from said non-volatile memory and resuming operations in accordance therewith.

6. A method as described in claim 5 comprising the further step of: prior to said resumption of operations displaying a menu including said retrieved information and a plurality of choices, including a choice to resume operations in accordance with said retrieved information, and resuming said operations only in response to selection of that choice by an operator.

* * * * *